(12) United States Patent
Krishnamoorthy et al.

(10) Patent No.: US 12,187,190 B1
(45) Date of Patent: Jan. 7, 2025

(54) COLLAPSIBLE LAMP FIXINGS FOR ROAD USER PROTECTION AND DAMAGE MITIGATION

(71) Applicant: Rivian IP Holdings, LLC, Irvine, CA (US)

(72) Inventors: Revathi Krishnamoorthy, Rancho Santa Margarita, CA (US); Shubham Prakash Kulkarni, Irvine, CA (US); Diana Betzabe Cuellar Alcala, Irvine, CA (US); Vijay Jayaraman, Irvine, CA (US); Shammika Ashan Wickramasinghe, Banbury (GB); Timothy Beaven, Bicester (GB); Simon Baker, Basingstoke (GB); Siobhan Marie Casey, Newport Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/515,165

(22) Filed: Nov. 20, 2023

(51) Int. Cl.
*B60Q 1/26* (2006.01)
*B60Q 1/04* (2006.01)

(52) U.S. Cl.
CPC ......... *B60Q 1/2619* (2013.01); *B60Q 1/0483* (2013.01)

(58) Field of Classification Search
CPC ............................ B60Q 1/2619; B60Q 1/0483
See application file for complete search history.

(56) References Cited

U.S. PATENT DOCUMENTS

| 6,257,749 B1 * | 7/2001 | Ward | F21S 41/55 362/549 |
| 10,933,820 B1 * | 3/2021 | Budraitis | B60R 13/105 |

* cited by examiner

*Primary Examiner* — Joseph L Williams
(74) *Attorney, Agent, or Firm* — BAKERHOSTETLER

(57) ABSTRACT

A lamp for a vehicle includes brackets designed to break in response to a force, or load, to the lamp. Based in part on the breaking of the brackets, the lamp may move relative to the vehicle. As a result, when a pedestrian provides the force, the impact by the lamp to the pedestrian is reduced, thus decreasing the likelihood of injury to the pedestrians. A lamp may further include one or more clips that secure to a front end module of the vehicle. In the event of impact to the lamp, the clip(s) promote movement of the lamp relative to the vehicle. A lamp may further include a damper designed to absorb energy from the force to the lamp.

20 Claims, 14 Drawing Sheets

COLLAPSIBLE LAMP FIXINGS FOR ROAD USER PROTECTION AND DAMAGE MITIGATION

INTRODUCTION

Vehicles may include multiple lamps to provide illumination around the vehicle during, for example, instances of relatively low visibility. Some vehicles may include multiple lamps, including two front lamps and a center lamp.

SUMMARY

The subject technology is directed to lamps in vehicles, and more particularly, to modifying lamps to collapse, or move, in certain instances. In one or more implementations, the lamp includes several brackets designed to break away from the lamp in response to a force (e.g., from a load) to the lamp. Alternatively or in combination, the lamp may include several clips that secure to mounting features in a vehicle. When the lamp absorbs the force, the clips will move relative to the mounting features, allowing the lamp to move relative to portions of the vehicle. Beneficially, when the lamp is impacted by a pedestrian, the lamp moves and provides less force (e.g., counterforce) to the pedestrian, thus minimizing the likelihood of injury to the pedestrian.

In accordance with one or more aspects of the disclosure, an apparatus is disclosed. The apparatus may include a housing configured to carry a light source. The apparatus may further include a first bracket configured to couple the housing with a vehicle. The first bracket may include a first notch. In one or more implementations, in response to an applied force to the housing, the first bracket is configured to break at the first notch, thereby allowing movement of the housing and the light source.

The apparatus may further include a second bracket. In one or more implementations, the first bracket extends from the housing in a first direction, and the second bracket extends from the housing in a second direction different from the first direction. The first direction may be perpendicular to the second direction. The first bracket and the second bracket may be integrally formed with the housing. The first bracket and the second bracket may be fastened to the housing. The second bracket may include a second notch, and in response to the applied force, the second bracket is configured to break at the second notch.

The apparatus may further include a damper coupled with the housing. The damper may be configured to absorb at least some of the applied force. The damper may include a spring.

In accordance with one or more aspects of the present disclosure, an apparatus is disclosed. The apparatus may include a housing. The apparatus may further include a light source carried by the housing. The apparatus may further include a first clip extending from the housing and configured to couple with a module of a vehicle. In one or more implementations, in response to an applied force to the housing, the first clip is configured to move relative to the module.

The apparatus may further include a first bracket extending from the housing. The first bracket may include a first notch. In one or more implementations, in response to the applied force, the first bracket is configured to break at the first notch, thereby allowing movement of the first clip.

The housing may include a first surface and a second surface different from the first surface. The first clip may extend from the first surface. The first bracket may extend from the second surface.

The apparatus may further include a second bracket extending from the housing. The first bracket may include a second notch. In one or more implementations, in response to the applied force, the second bracket is configured to break at the second notch.

The apparatus may further include a second clip extending from the second surface between the first bracket and the second bracket. The first clip may extend in a first direction. The first bracket may extend in a second direction different from the first direction. The first clip and the first bracket may be integrally formed with the housing.

In accordance with one or more aspects of the present disclosure, a vehicle is disclosed. The vehicle may include a body that includes a cavity. The vehicle may further include an apparatus located in the cavity and coupled to the body. The apparatus may include a housing. The apparatus may further include a light source carried by the housing. The apparatus may further include a plurality of brackets extending from the housing. In one or more implementations, in response to an applied force to the apparatus, the plurality of brackets are configured to break away from the housing and the housing is configured to move within the cavity.

The vehicle may further include a module coupled to the body. The vehicle may further include a clip coupled to the housing and engaged with the module. In one or more implementations, in response to the applied force, the clip moves relative to the module. The module may include a first extension and a second extension. The clip may be positioned between the first extension and the second extension. The apparatus may further include a slot. The module may further include an opening configured to receive a bolt that extends into the slot.

The vehicle may further include a damper extending from the housing. The damper may be configured to absorb at least some of the applied force.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
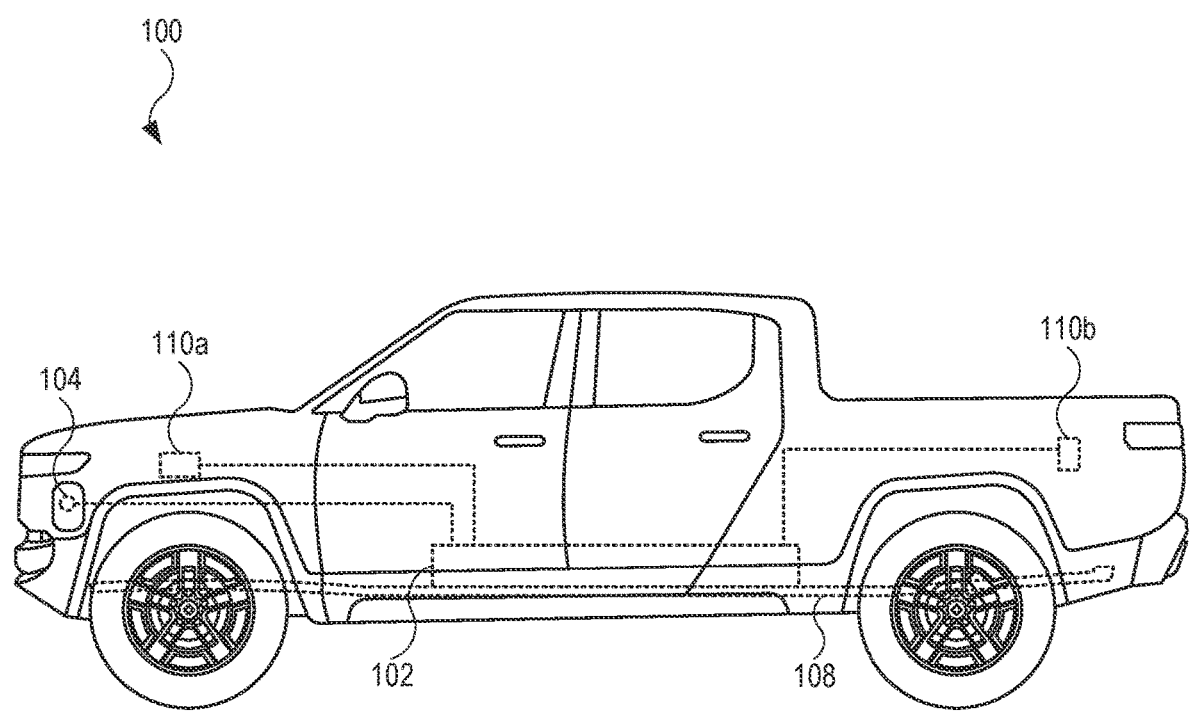
FIG. 1 illustrates an example of a vehicle, in accordance with aspects of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to collapsible lamps (e.g., movable lamps) in a vehicle. A lamp described herein may take the form of a light, a headlight, a light bar, or a light source, as non-limiting examples. Accordingly, a lamp may provide illumination for the vehicle, and in particular, for one or more passengers in the vehicle. Further, the lamp may be characterized as an apparatus, as discussed below. Several modifications and features of lamps are designed to limit or prevent injury to pedestrians in the event of contact between a vehicle and a pedestrian. In particular, the modifications and features of lamps described herein may reduce the severity of the impact to the pelvic region of pedestrians. Beneficially, lamps shown and/or described herein may reduce or prevent injury to pedestrians, and as a result, may increase the safety rating of a vehicle. Moreover, various objects (e.g., bicycles, powered two-wheel vehicles, another vehicle, a stationary object) that provide an applied force may sustain less impact.

Lamps described herein may include a housing, or enclosure, used to carry one or more lights sources (e.g., light emitting diode (LED), incandescent light bulb, or the like). The housing may include brackets used to secure the housing (and light source(s)) to the vehicle. The brackets may include one or more notches, or locations of reduced material, that provide relatively weak points in the brackets. Additionally, an internal volume (e.g., space, cavity) in the vehicle for the lamp is designed to provide a volume that is greater than that of the lamp. In this regard, when the lamp is impacted by a load, the brackets may break, causing the lamp to move, within the internal volume, relative to the vehicle. Accordingly, the lamp may not remain stationary upon impact Additionally, in one or more implementations, the housing includes several clips designed to secure with a module (e.g., front end module) of the vehicle. In response to an impact from a load, the clips may permit the lamp to move relative to the module. To create a desired frictional engagement between the clips and the modules, the clips may include springs and the modules may include grooves.

Further, in one or more implementations, a damper is installed on the housing. In response to an impact from a load, the lamp may move while the damper absorbs some of the energy from load that is transferred to the lamp, thereby reducing the severity to the lamp. Accordingly, the damper may limit impact from the lamp to a pedestrian, thus reducing the severity of injury to the pedestrian. As non-limiting examples, the damper may include a spring, such as a leaf spring or a helical spring.

In some example implementations, the aforementioned modifications and features are combined together for a lamp. For example, a lamp may include a combination of brackets, clips, and dampers.

FIG. 1 illustrates an example of a vehicle 100, in accordance with aspects of the present disclosure. In one or more implementations, the vehicle 100 is a sport utility vehicle (SUV). In the example shown in FIG. 1, the vehicle 100 is a truck. Generally, the vehicle 100 may take the form of any motorized vehicle, including motorized vehicles with an internal combustion engine and/or one or more electric motors. Accordingly, other implementations of the vehicle 100 may include land-based vehicles, such as a car (e.g., sedan, hatchback), a van, or a commercial truck, as non-limiting examples.

The vehicle 100 may include a battery pack 102. The battery pack 102 may be coupled (e.g., electrically coupled) to one or more electrical systems of the vehicle 100 to provide power to the one or more electrical systems. The vehicle 100 may further include a port 104 (e.g., charge port) designed to receive a cable connector (not shown in FIG. 1) used to transmit power (e.g., alternating current (AC) power) that is converted to direct current (DC) power to charge the battery pack 102. The vehicle 100 may include a chassis 108 used to support the battery pack 102 and various other components (not shown in FIG. 1) of the vehicle 100, such as a suspension, as non-limiting examples.

The battery pack 102 may couple to a drive unit 110a and a drive unit 110b, also referred to as a front drive unit and a rear drive unit, respectively. Each of the drive units 110a and 110b may include, for example, a motor, an inverter, a gear box, and a differential. In the example shown in FIG. 1, each of the drive units 110a and 110b takes the form of an electric motor. In this regard, each of the drive units 110a and 110b may use energy (e.g., electrical energy) stored in the battery pack 102 for propulsion in order to drive (e.g., rotationally drive) wheels of the vehicle 100.

Figure 2:
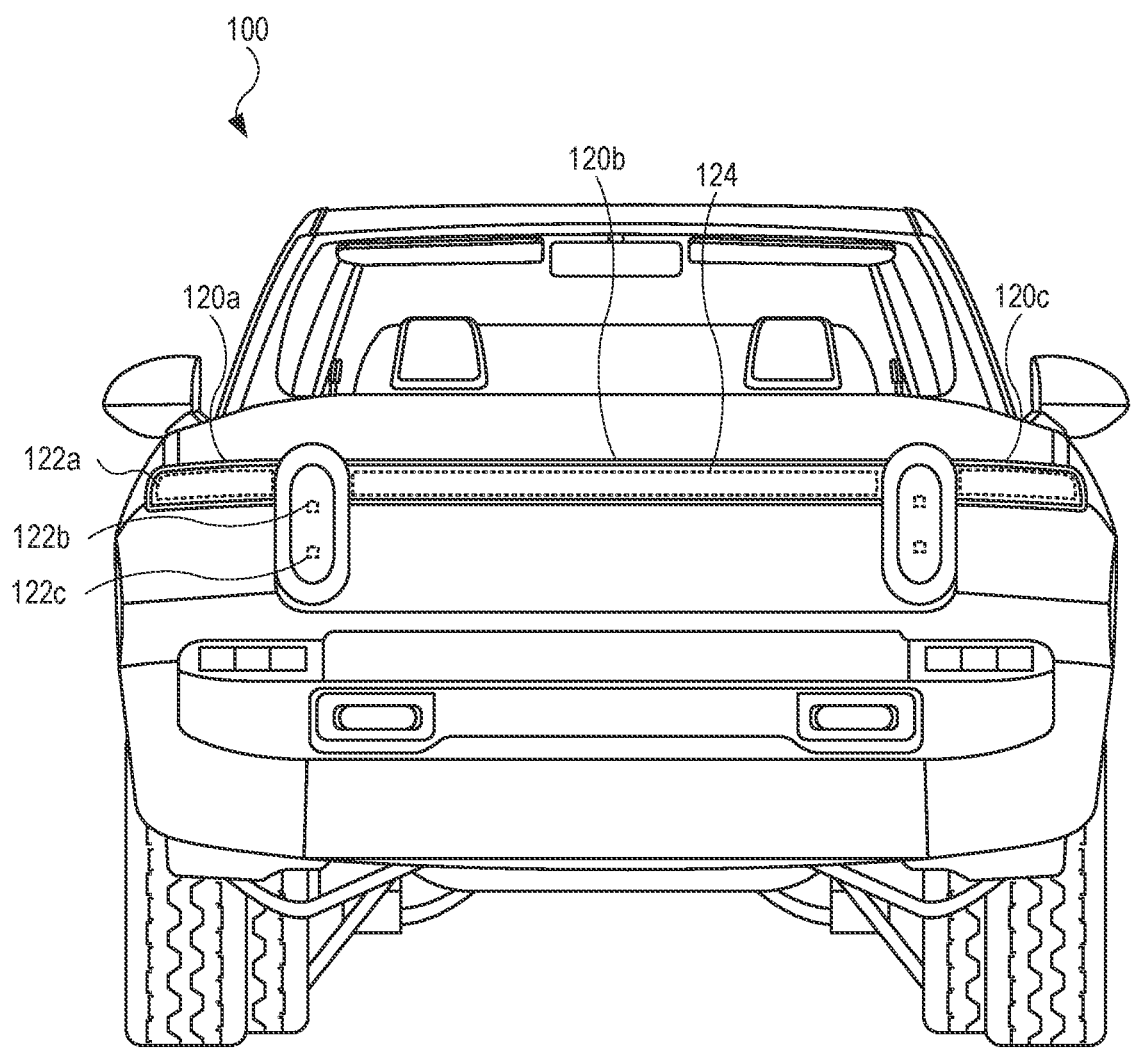
FIG. 2 illustrates a front view of a vehicle, in accordance with aspects of the present disclosure.

FIG. 2 illustrates a front view of the vehicle 100, in accordance with aspects of the present disclosure. The vehicle 100 may include several lamps. For example, in one or more implementations, the vehicle 100 includes a lamp 120a, a lamp 120b, and a lamp 120c. Each of the lamps 120a, 120b, and 120c may include one or more lights sources designed to illuminate and increase visibility for passengers of the vehicle 100. For example, the lamp 120a includes a light source 122a, a light source, 122b, and a light source 122c. The light sources 122a, 122b, and 122c may be representative of additional light sources for the lamp 120a as well as the lamp 120c. Also, the lamp 120b may include a light source 124 representative of one or more light sources. Each of the described light sources may take the form of an LED or an incandescent bulb, as non-limiting examples. The lamps 120a and 120c may be referred to as headlights or headlamps, and the lamp 120b may be referred to as a center lamp. The vehicle 100 may further include a power supply (not shown in FIG. 2), such as a battery pack, that provides energy (e.g., electrical energy) that causes the light sources 122a, 122b, 122c, and 124 to illuminate.

Figure 3:
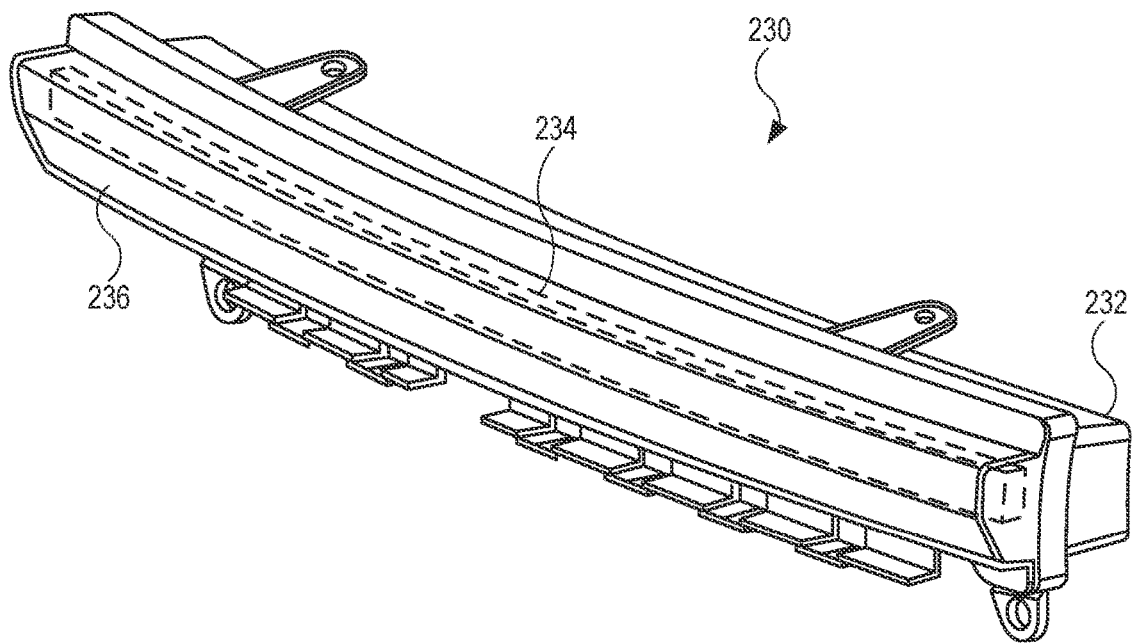
FIG. 3 and FIG. 4 illustrate perspective views of an example of an apparatus, in accordance with aspects of the present disclosure.
Figure 4:
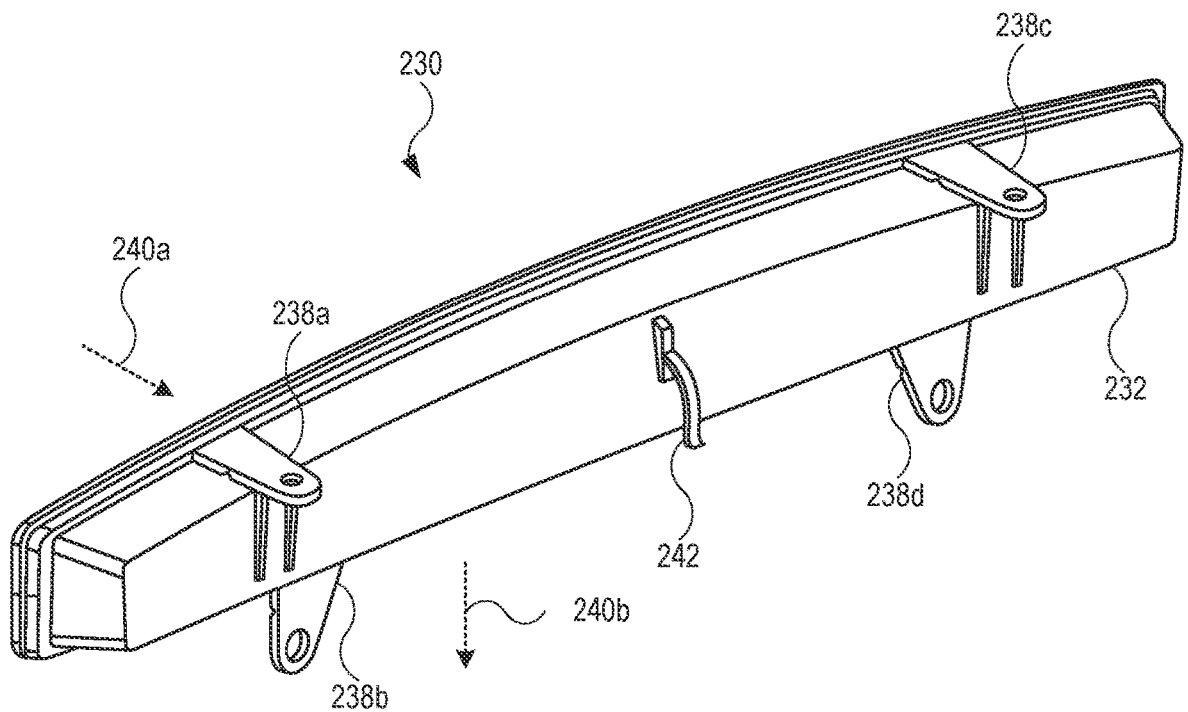

FIG. 3 and FIG. 4 illustrate perspective views of an example of an apparatus 230, in accordance with aspects of the present disclosure. The apparatus 230 may take the form of a lamp, such as the lamp 120b (shown in FIG. 2). Accordingly, the apparatus 230 may be referred to as a center lamp.

Referring to FIG. 3, the apparatus 230 may include a housing 232. The housing 232, or enclosure, may include a multi-dimensional structure formed from a polymer (e.g., plastic), as a non-limiting example. The housing 232 may be formed by a molding operation (e.g., injection molding), as a non-limiting example. The housing 232 may form an internal volume designed to carry components such as a light source 234, which may be representative of one or more light sources. The apparatus 230 may further include a cover 236 that combines with the housing 232 to enclose the light source 234. In one or more implementations, the housing 232 may include one or more opaque materials, while the cover 236 may include one or more transparent materials. In this regard, the light source 234, when illuminated, emits light capable of passing through the cover 236.

Referring to FIG. 4, the housing 232 may include several brackets designed to secure the apparatus 230 with a vehicle (e.g., vehicle 100 shown in FIGS. 1 and 2). For example, the housing 232 may include a bracket 238a, a bracket 238b, a bracket 238c, and a bracket 238d. Each of the brackets 238a, 238b, 238c, and 238d may include an opening (shown, not labeled) designed to receive a fastener (e.g., bolt), thus allowing the apparatus 230 to secure with a vehicle. The brackets may extend from the housing 332 in different directions. For example, the brackets 238a and 238c may extend along a direction of an arrow 240a, while the brackets 238b and 238d may extend along a direction of an arrow 240b. In one or more implementations, the arrows 240a and 240b are perpendicular with respect to each other. Accordingly, the brackets 238a and 238c may be perpendicular, or at least approximately perpendicular, with respect to the brackets 238b and 238d. While the brackets 238a, 238b, 238c, and 238d are shown in particular locations on the housing 232, each of the brackets 238a, 238b, 238c, and 238d may be positioned at different locations on the housing 232. Additionally, while the brackets 238a, 238b, 238c, and 238d illustrate a particular number of brackets (e.g., four brackets), the number of brackets may vary in other implementations of the apparatus 230.

Additionally, in one or more implementations, the apparatus 230 further includes a damper 242 designed to absorb energy from, for example, a force applied to the apparatus 230. As non-limiting examples, the damper 242 may include a spring (e.g., leaf spring, helical spring) or a clip (e.g., bendable clip).

FIG. 5A through FIG. 16 show and describe additional features and modifications for an apparatus. At least some of the features and modifications shown and described in FIG. 5A through FIG. 16 may be applied to the apparatus 230 shown in FIGS. 3 and 4. Moreover, at least some of the features and modifications for an apparatus 230 shown and described in FIGS. 3 and 4 may be applied to the apparatuses shown in FIG. 5A through FIG. 16.

Figure 5A:
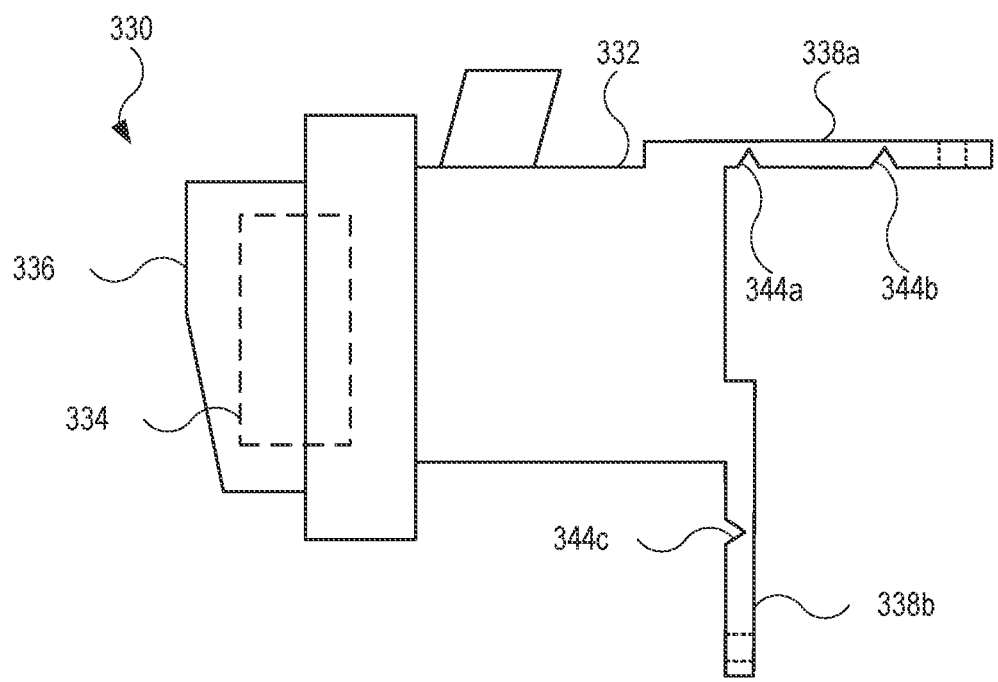
FIG. 5A and FIG. 5B illustrate side views of examples of apparatuses, in accordance with aspects of the present disclosure.
Figure 5B:
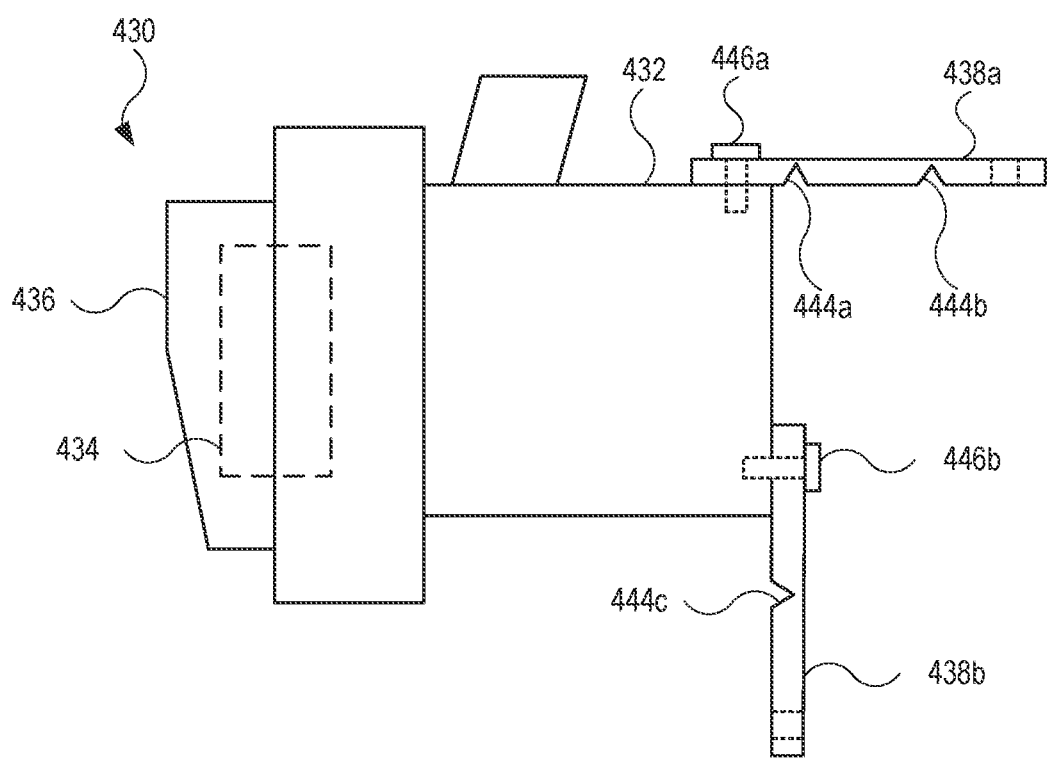

FIG. 5A and FIG. 5B illustrate side views of examples of an apparatus, in accordance with aspects of the present disclosure. Referring to FIG. 5A, an apparatus 330 may include a housing 332, a light source 334, and a cover 336. Several brackets may extend from the housing 332. For example, a bracket 338a and a bracket 338b (representative of additional brackets) extend from the housing 332. Each of the brackets 338a and 338b may include an opening (not labeled, shown as dotted lines), thus allowing a fastener (e.g., bolt) to pass through the brackets 338a and 338b to secure the apparatus 330 in a vehicle (e.g., vehicle 100 shown in FIGS. 1 and 2). However, in certain circumstances, the brackets 338a and 338b are designed to break (e.g., fail). In this regard, each of the brackets 338a and 338b may include one or more notches. For example, the bracket 338a may include a notch 344a and a notch 344b. Similarly, the bracket 338b may include a notch 334c. The notches 344a and 344b represent locations of the bracket 338a that are relatively thin and thus include relatively less material. Similarly, the notch 344c represents a location of the bracket 338b that is relatively thin and includes relatively less material. Although a discrete number of notches are shown, the number of notches may vary in other example implementations.

Based upon the notches 344a, 344b, and 344c (representative of other notches shown and/or described herein), the brackets 338a and 338b may be designed to break from an applied force applied to the apparatus 330. The applied force that causes the brackets 338a and 338b to break may include a relatively lower amount of applied force as compared to similar brackets without notches. In this regard, each of the notches 344a, 344b, and 344c may be "tuned," or modified/adjusted, thereby allowing the brackets 338a and 338b to break based on upon a predetermined or predefined range of applied forces. For example, the notches 344a and 344b may cause the bracket 338a to break in response to a force to the apparatus 330. Similarly, the notch 344c may cause the bracket 338b to break in response to a force to the apparatus 330.

Also, as shown in FIG. 5A, the brackets 338a and 338b may be integrally formed with the housing 332. The phrase "integrally formed" or "integrally form" may refer to two or more structures formed together with the same material. For example, a molding operation may be used to integrally form the brackets 338a and 338b with the housing 332. However, other ways for coupling or securing brackets to a housing maybe implemented.

For example, FIG. 5B illustrates an example of an apparatus 430 with a housing 432 with a bracket 438a and a bracket 438b fastened or affixed to the housing 432 by a fastener 446a and a fastener 446b, respectively. The apparatus 430 may further include light source 434 and a cover 436. For example, the bracket 438a may include a notch 444a and a notch 444b, and the bracket 438b may include a notch 444c. Based upon the notches 444a and 444b, the bracket 438a may break from an applied force to the apparatus 430. Similarly, based upon the notch 444c, the bracket 438b may break from an applied force to the apparatus 430. In the event the brackets 438a and 438b break, the fastener 446a and the fastener 446b can be removed from the housing 432, allowing the remaining portions of the brackets 438a and 438b to be removed and replaced. Beneficially, the apparatus 430 can be reused in the vehicle.

Figure 6:
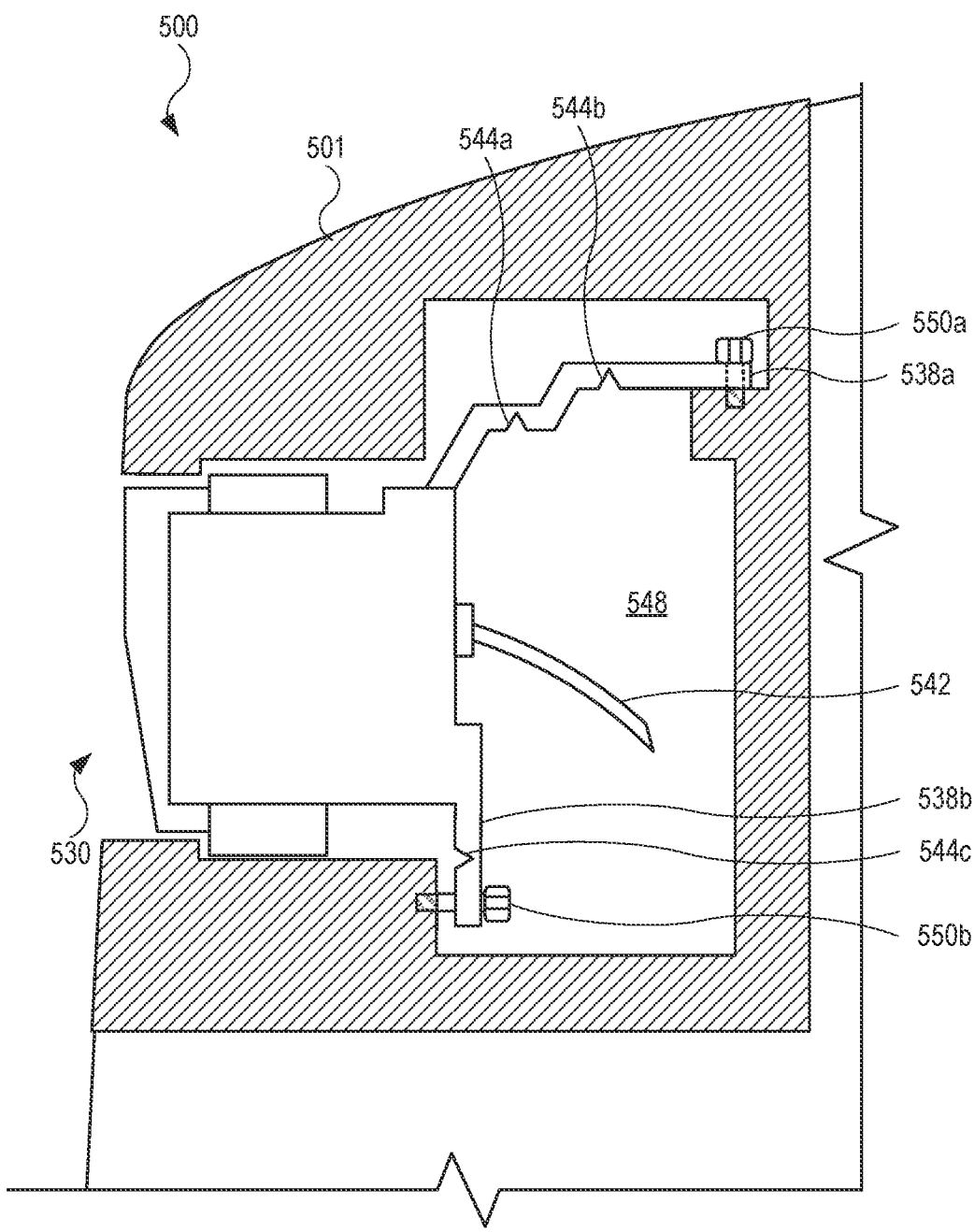
FIG. 6 and FIG. 7 illustrate enlarged, partial cross sectional views of a vehicle, showing an apparatus in the vehicle, in accordance with aspects of the present disclosure.
Figure 7:
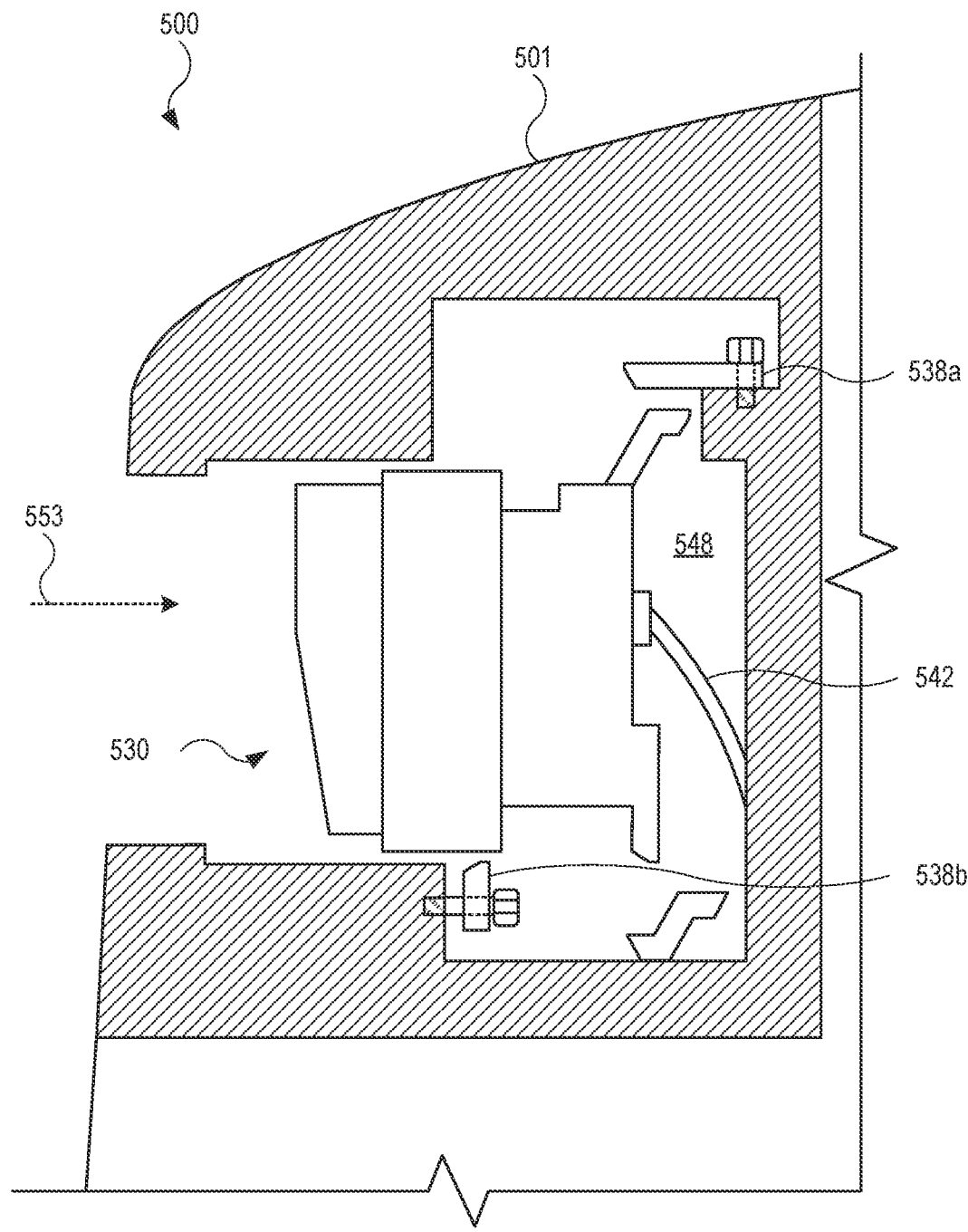

FIG. 6 and FIG. 7 illustrate enlarged, partial cross sectional views of a vehicle 500, showing an apparatus 530 in the vehicle 500, in accordance with aspects of the present disclosure. The vehicle 500 and the apparatus 530 may include any features previously described for a vehicle and an apparatus, respectively. Referring to FIG. 6, the apparatus 530 is installed in the vehicle 500 (e.g., in a front end of the vehicle 500). The vehicle 500 may include a body 501 with an internal volume 548, or space, designed to receive the apparatus 530. The internal volume 548 may include a volume that is greater than that of the apparatus 530. As a result, the internal volume 548 may be designed to provide additional space for the apparatus 530 in the event the apparatus 530 moves relative to the vehicle 500. This will be shown and described in further detail below.

As shown, the apparatus 530 may include a housing 532, as well as a bracket 538a and a bracket 538b (representative of additional brackets) extending from the housing 532. Further, a fastener 550a and a fastener 550b passes through respective openings of the bracket 538a and the bracket 538b, and securing to the vehicle 500. Also, the bracket 538a includes a notch 544a and a notch 544b, and the bracket 538b includes a notch 544c. In one or more implementations, one or more brackets of the apparatus 530 may extend in multiple directions. For example, as shown in FIG. 6, the bracket 538a may include a stepped configuration that extends in multiple, different directions.

The apparatus 530 may further include a damper 542 extending from the housing 532. In response to an applied force (e.g., at or above a threshold force) to the apparatus 530, the brackets 538a and 538b may break. For example, referring to FIG. 7, an applied force in a direction of an arrow 553 causes the brackets 538a and 538b to break, as well as one or more additional brackets (not shown in FIG. 7). Further, the force may cause the apparatus 530 to move in the direction of the arrow 553. Based on the dimensions of the internal volume 548 of the body 501, apparatus 530 may move within the internal volume 548. Put another way, the vehicle 500 may be designed such that object or other obstructing features do no limit movement of the apparatus 530. However, the damper 542 may absorb at least some of the applied force. When engaged with the vehicle 500, the damper 542 may limit at least some movement of the apparatus 530.

Figure 8:
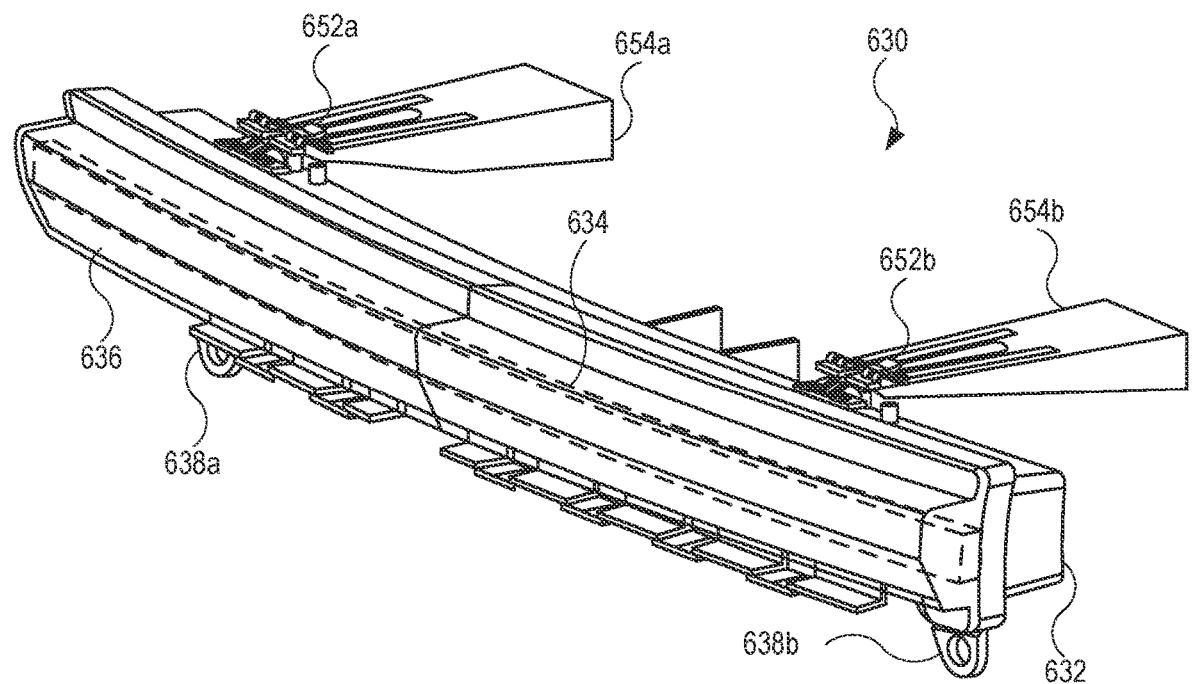
FIG. 8 and FIG. 9 illustrate perspective views of an alternate example of an apparatus, in accordance with aspects of the present disclosure.
Figure 9:
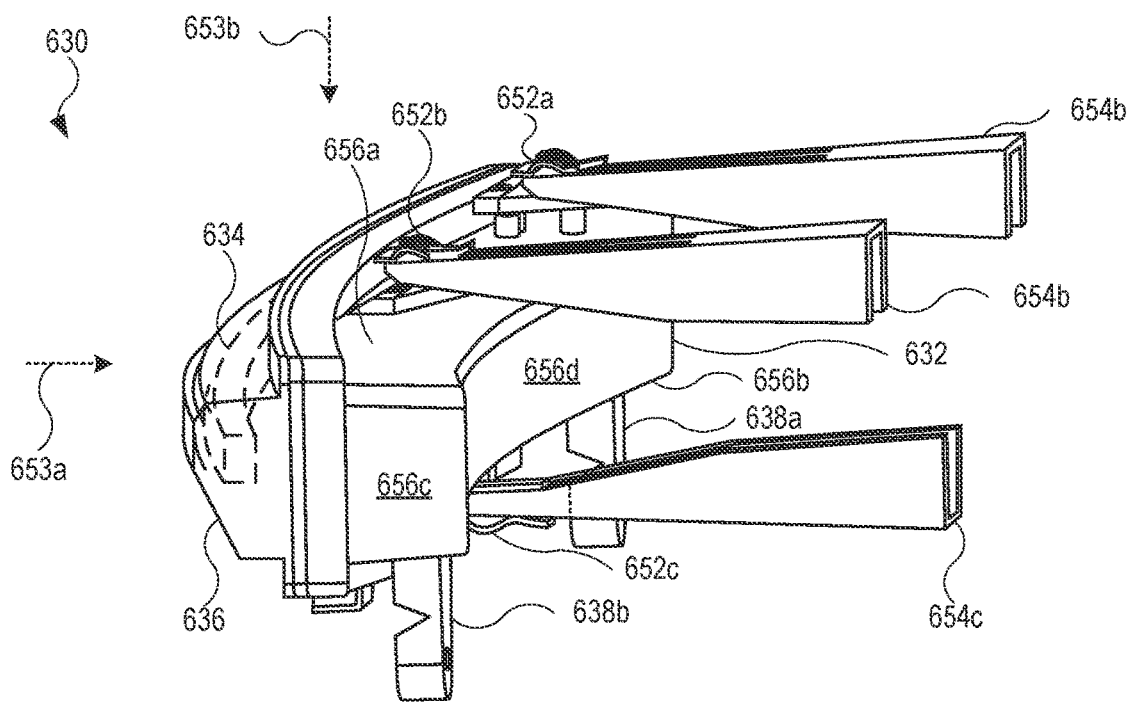

FIG. 8 and FIG. 9 illustrate perspective views of an alternate example of an apparatus 630, in accordance with aspects of the present disclosure. The apparatus 630 may include a housing 632. The housing 632 may form an internal space designed to carry components such as a light source 634, which may be representative of one or more light sources. The apparatus 630 may further include a cover 636 that combines with the housing 632 to enclose the light source 634. In one or more implementations, the housing 632 may include one or more opaque materials, while the cover 636 may include one or more transparent materials. In this regard, the light source 634, when illuminated, emits light capable of passing through the cover 636.

Additionally, the apparatus 630 may include a bracket 638a and a bracket 638b. Each of the brackets 638a and 638b may include one or more notches (shown, not labeled), allowing the brackets 638a and 638b to break in a manner previously described. Additionally, the apparatus 630 may include several clips. For example, as shown in FIG. 8, the apparatus 630 may include a clip 652a and a clip 652b secured with, and extending from, the housing 632. Each of the clips 652a and 652b is designed to couple with a module 654a and a module 654b, respectively. The modules 654a and 654b (e.g., front end modules) may be secured with a front end of a vehicle (not shown in FIG. 8).

As shown in FIG. 9, the apparatus 630 may further include a clip 652c designed to couple with a module 654c (e.g., front end modules), which may be secured with a front end of a vehicle (not shown in FIG. 9). Additional relationships of the apparatus 630 may also be present. For example, the housing 632 may include a surface 656a and a surface 656b opposite the surface 656a. The housing 632 may receive the clips 652a and 652b at the surface 656a, and may further receive the clip 652c at the surface 656b. Additionally, the brackets 638a and 638b may extend from the surface 656b, and the clip 652c may be positioned between the brackets 638a and 638b.

An applied force to the apparatus 630 in a direction of an arrow 653a may cause the brackets 638a and 638b to break. Additionally, the clips 652a, 652b, and 652c allow the apparatus 630 to move relative to the modules 654a, 654b, and 654c. In this regard, the clips 652a, 652b, and 652c may slide along the modules 654a, 654b, and 654c, respectively. As shown, the housing 632 further includes a surface 656c and a surface 656d, each of which may be perpendicular to the surfaces 656a and 656b. In one or more implementations, one or more of the surfaces 656c and 656d may include one or more brackets (e.g., similar to the brackets 638a and 638b). Also, one or more of the surfaces 656c and 656d may further include one or more clips (e.g., similar to the clips 652a, 652b, and 652c) engaged with a respective module (e.g., similar to the modules 654a, 654b, and 654c). An applied force to the apparatus 630 in a direction of an arrow 653b (perpendicular to the arrow 653a) may cause the apparatus 630 to move in a direction of the arrow 653b, with the movement being facilitated by the one or more brackets and clips located on at least one of the surfaces 656c and 656d. Moreover, one or more of the surfaces 656a and 656b may include one or more brackets and clips that are oriented perpendicular to the brackets 638a and 636b and the clips 652a and 652b shown in FIG. 9. In this regard, an applied force to the apparatus 630 in a direction perpendicular to the arrows 653a and 635b may cause the apparatus 630 to move in a direction perpendicular to the arrows 653a and 635b, with the movement being facilitated by the one or more perpendicularly positioned brackets and clips located on at least one of the surfaces 656a and 656b. Accordingly, based upon the orientation and location of clips and brackets, the apparatus 630 may be designed to move in different directions (e.g., along three different axes). In this regard, impact from pedestrians of different sizes and/or from objects of different sizes may contact the apparatus 630 at different angles and/or from different directions. Beneficially, the apparatus 630 may respond to impact by moving in one of several different directions based on the direction of the impact.

Figure 10:
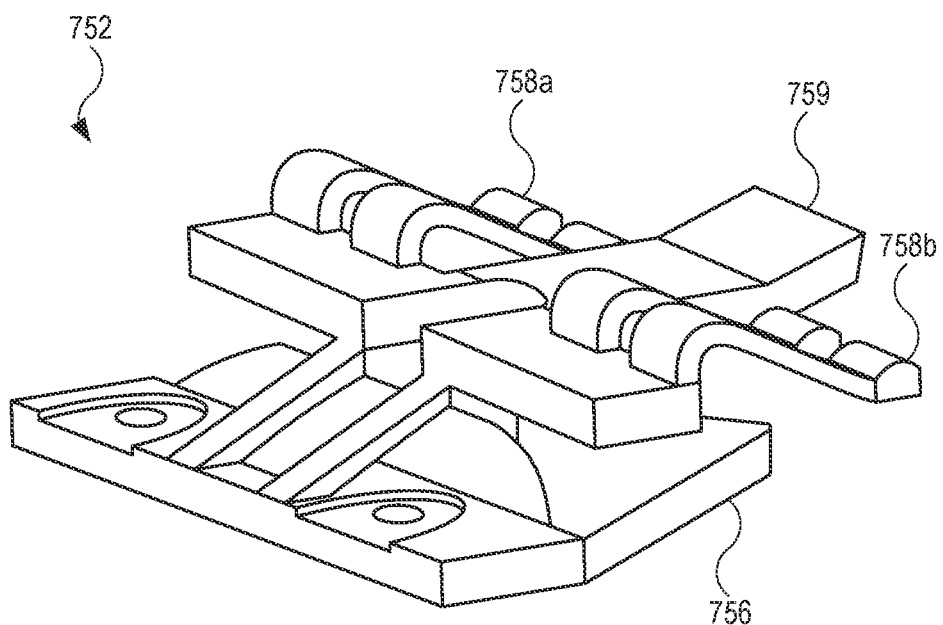
FIG. 10 illustrates a perspective view of a clip, in accordance with aspects of the present disclosure.

FIG. 10 illustrates a perspective view of a clip 752, in accordance with aspects of the present disclosure. As shown, the clip 752 includes a base 756 with several openings (shown, not labeled) designed to receive a fastener to secure the clip 752 to a housing of an apparatus (e.g., apparatus 630 shown in FIGS. 8 and 9). The clip 752 may further include a spring 758a and a spring 758b. In one or more implementations, the springs 758a and 758b bend or flex in response to engagement with a module (e.g., modules 654a, 654b, and 654c, shown in FIGS. 8 and 9). The spring constant of the springs 758a and 758b may be selected to control the amount of force required to move the springs 758a and 758b, thus controlling the amount of force required to move an apparatus onto which the clip 752 is mounted. The clip 752 may further include an extension 759 between the springs 758a and 758b. The extension 759 may be relatively rigid as compared to the springs 758a and 758b. The clips 652a, 652b, and 652c (shown in FIG. 9) may include any features shown and described herein for the clip 752.

During use, a module may engage the clip 752 by being positioned in a location between the base 756 and the structures defined by the springs 758a and 758b and the extension 759. When the clip 752 moves relative to the module, the clip 752 may pass through a void in the module, which may cause the springs 758a and 758b to bend.

Figure 11:
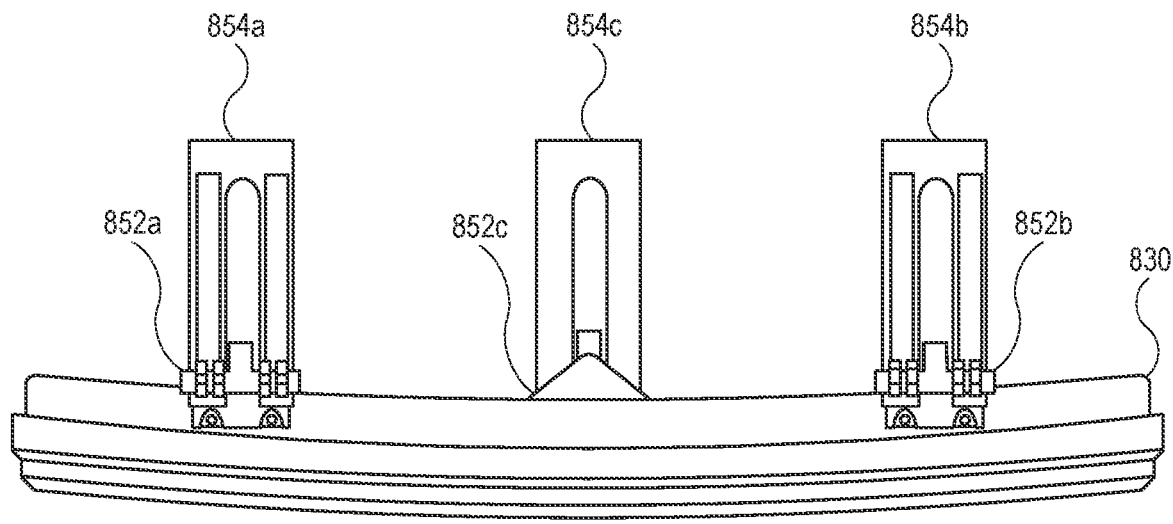
FIG. 11 and FIG. 12 illustrate aerial views of an apparatus, further showing movement of the apparatus, in accordance with aspects of the present disclosure.
Figure 12:
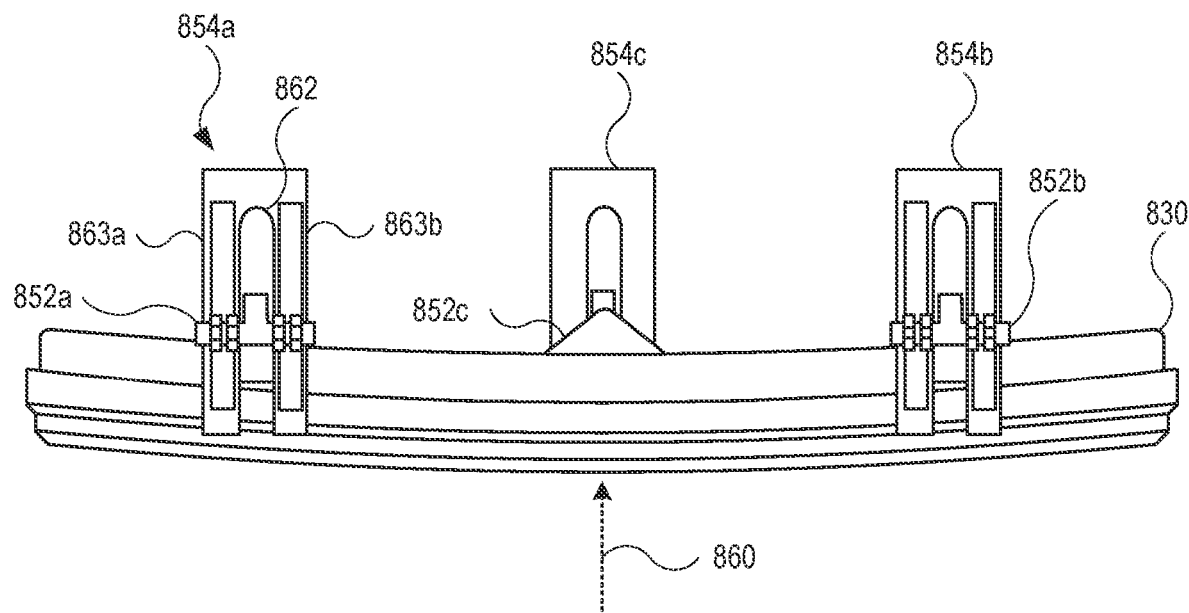

FIGS. 11 and 12 illustrate aerial views of an apparatus 830, further showing movement of the apparatus 830, in accordance with aspects of the present disclosure. Referring to FIG. 11, the apparatus 830 includes a clip 852a, a clip 852b, and a clip 852c engaged with a module 854a, a module 854b, and a module 854c, respectively. Although not expressly shown, the apparatus 830 may include additional features (e.g., brackets). Referring to FIG. 12, in response to a force in a direction of an arrow 860, the apparatus 830 may move relative to the modules 854a, 854b, and 854c. Accordingly, the clips 852a, 852b, and 852c may move relative to the modules 854a, 854b, and 854c. Each of the modules 854a, 854b, and 854c includes a void, or space, allowing the clips 852a, 852b, and 852c, respectively, to pass therethrough. For example, the module 854a include a void 862 (representative of respective voids in the modules 854b and 854c) through which the clip 852a may pass. As shown, the void 862 is located between an extension 863a and an extension 863b of the module 854a.

Figure 13A:
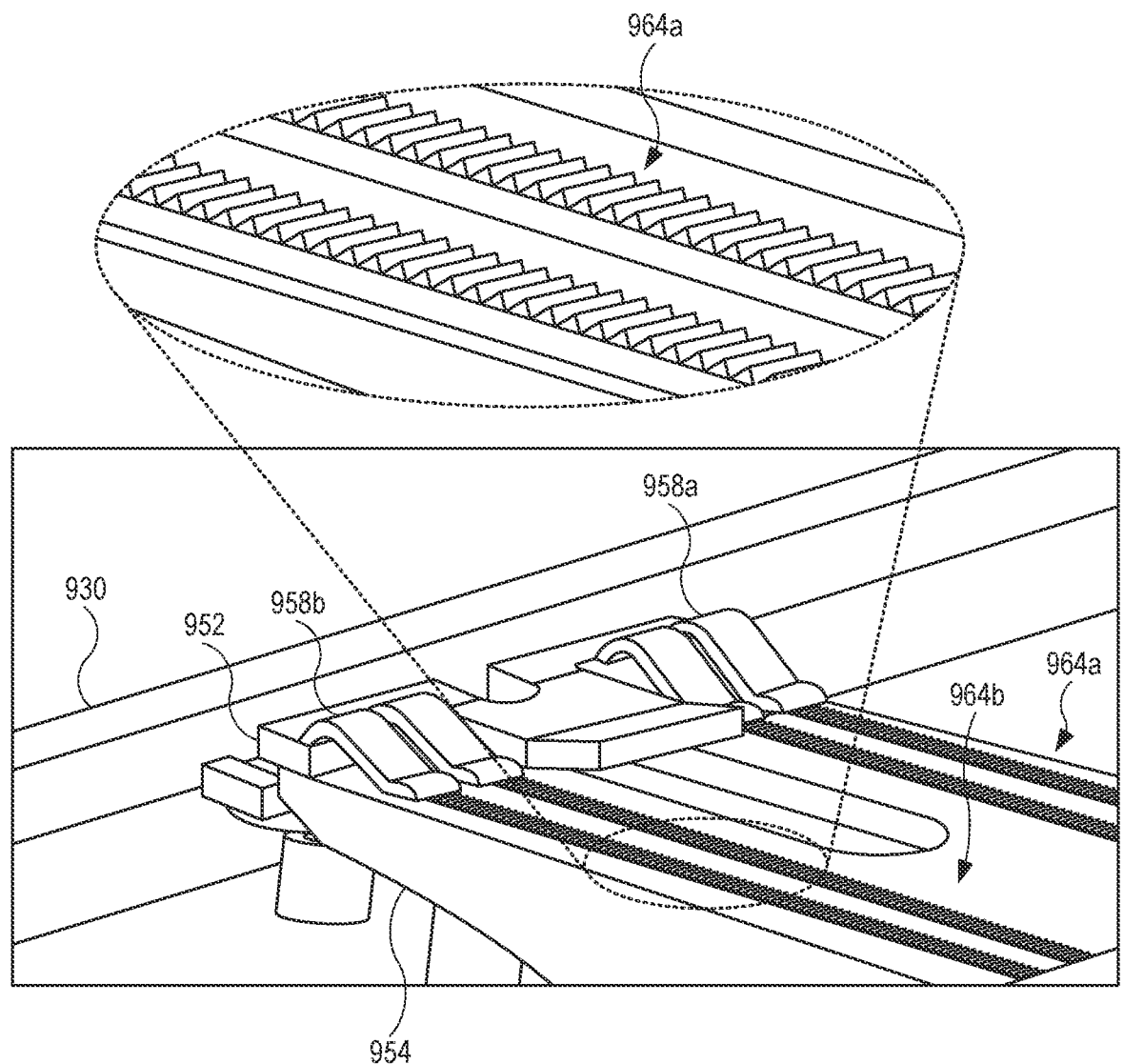
FIG. 13A illustrates a perspective view of an example of a module, in accordance with aspects of the present disclosure.

FIG. 13A illustrates a perspective view of an example of a module 954, in accordance with aspects of the present disclosure. As shown, the module 954 is engaged with an apparatus 930, and in particular, with a clip 952 positioned on the apparatus 930. In one or more implementations, the module 954 includes features designed to increase the mechanical and/or frictional engagement with the clip 952. For example, the module 954 may include grooves 964a and grooves 964b. Each of the grooves 964a and 964b may represent one or more sets of grooves. Further, based on the alignment between the module 954 and the clip 952, the grooves 964a and the grooves 964b engage a spring 958a and a spring 958b, respectively, of the clip 952.

As shown in the enlarged view, the grooves 964b (representative of the grooves 964a) may include several peaks and valleys. The peaks and valleys of the grooves 964b may be adjusted (e.g., raised, lowered, spaced closer, further apart). Accordingly, the force required to move the clip 952 may be determined not only by the springs 958a and 956b, but also by the grooves 964a and 964b.

Figure 13B:
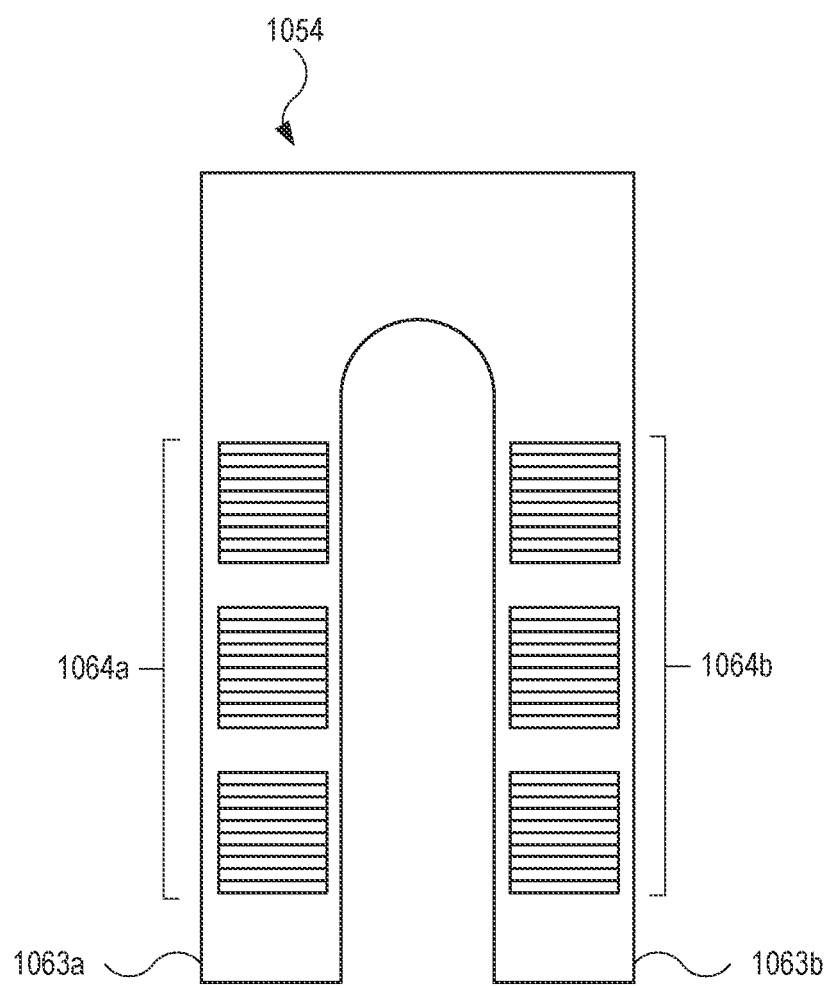
FIG. 13B illustrates an aerial view of an alternate example of a module, in accordance with aspects of the present disclosure.

FIG. 13B illustrates an aerial view of an alternate example of a module 1054, in accordance with aspects of the present disclosure. As shown, the module 1054 may include an extension 1063a and an extension 1063b, with the extension 1063a and the extension 1063b having grooves 1064a and grooves 1064b, respectively. As shown, the grooves 1064a and 964b may include modular sets of grooves. Put another way, the grooves 1064a and 1064b may include multiple, distinct sets of grooves. By using modular sets of grooves, the module 1054 may provide varied engagement with a clip (not shown in FIG. 13B), thus providing at least some influence with respect to the movement of an apparatus (not shown in FIG. 13B) that includes the clip.

Figure 14:
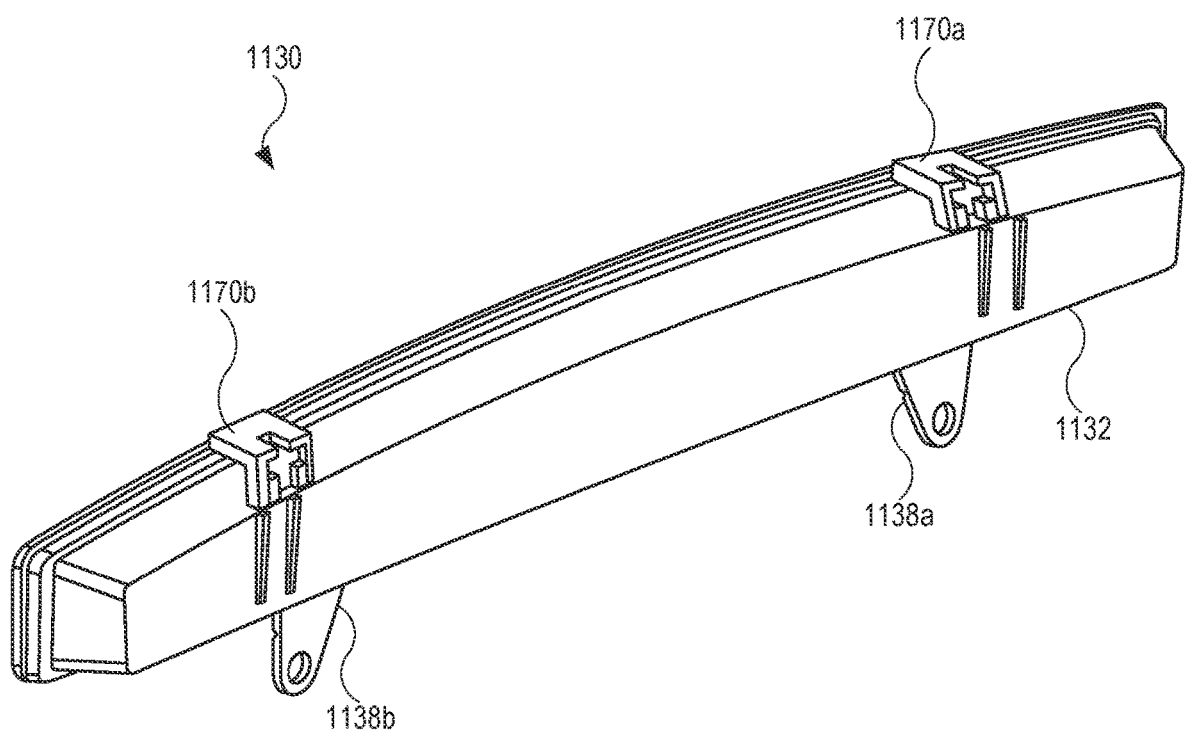
FIG. 14 illustrates a perspective view of an alternate example of an apparatus, showing alternative brackets, in accordance with aspects of the present disclosure.

FIG. 14 illustrates a perspective view of an alternate example of an apparatus 1130, showing alternative brackets, in accordance with aspects of the present disclosure. As shown, the apparatus 1130 includes a housing 1132. The apparatus 1130 may further include a bracket 1138a and a bracket 1138b extending from the housing 1132. The brackets 1138a and 1138b may include at least some features previously described for brackets (e.g., notches). Additionally, the apparatus 1130 may include a bracket 1170a and a bracket 1170b extending from the housing 1132. Each of the brackets 1170a and 1170b is designed to receive a fastener (e.g., bolt) to couple the apparatus 1130 with a module.

Figure 15:
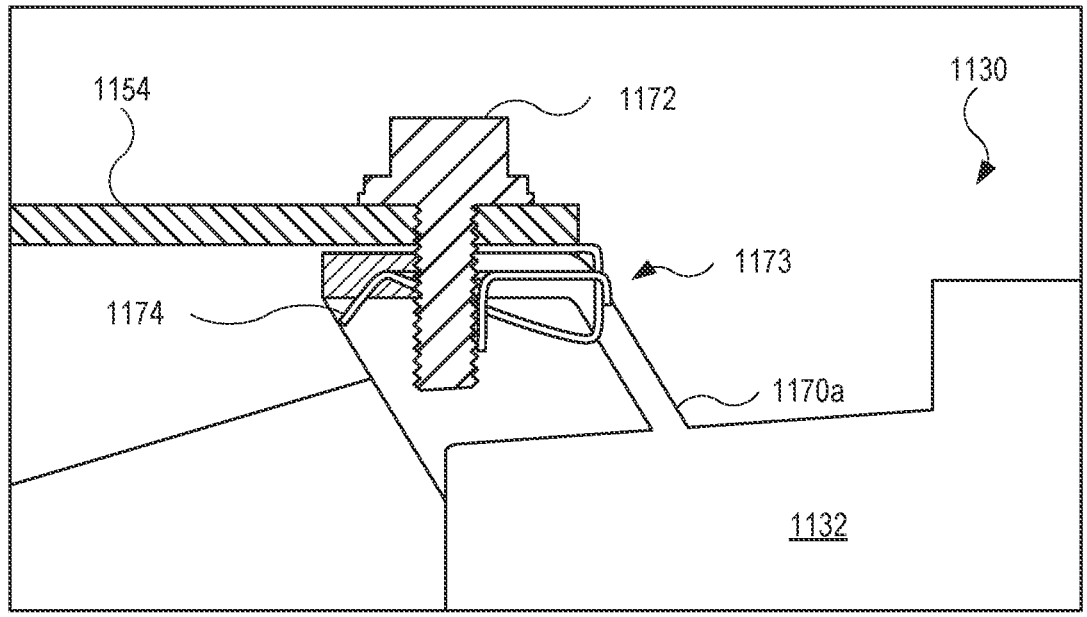
FIG. 15 and FIG. 16 illustrate a partial cross sectional view of an apparatus, further showing a bracket coupled to a module by a fastener, in accordance with aspects of the present disclosure.
Figure 16:
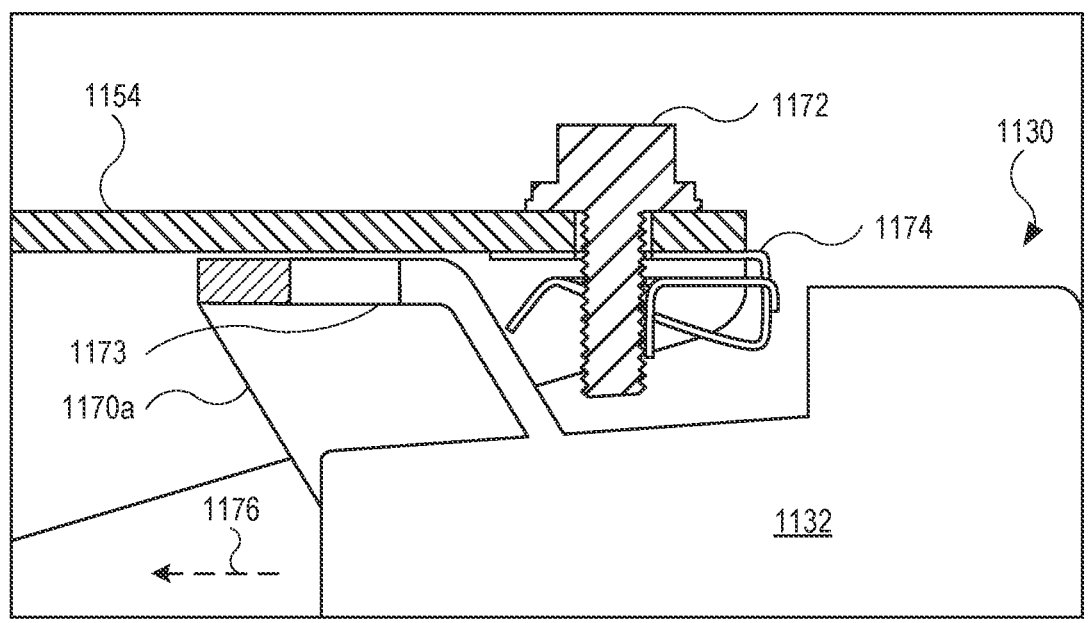

FIG. 15 and FIG. 16 illustrate a partial cross sectional view of the apparatus 1130, further showing the bracket 1170a coupled to a module 1154 by a fastener 1172, in accordance with aspects of the present disclosure. As shown in FIG. 15, the fastener 1172 (e.g., bolt) passes through an opening of the module 1054, and through a slot 1173 of the bracket 1170a. Additionally, a clip 1174 may be used to secure the fastener 1172 with the bracket 1170a. In one or more implementations, the clip 1174 takes the form of a J-clip.

As shown in FIG. 16, the apparatus 1130 may move a direction of an arrow 1176 in response to a force in the direction of the arrow 1176. In this regard, the apparatus 1130 and the bracket 1170a may move relative to the module 1154. The clip 1174 may release the bracket 1170a and remain in place with the fastener 1172. Also, the force may cause the fastener 1172 to be removed from the slot 1173.

Figure 17:
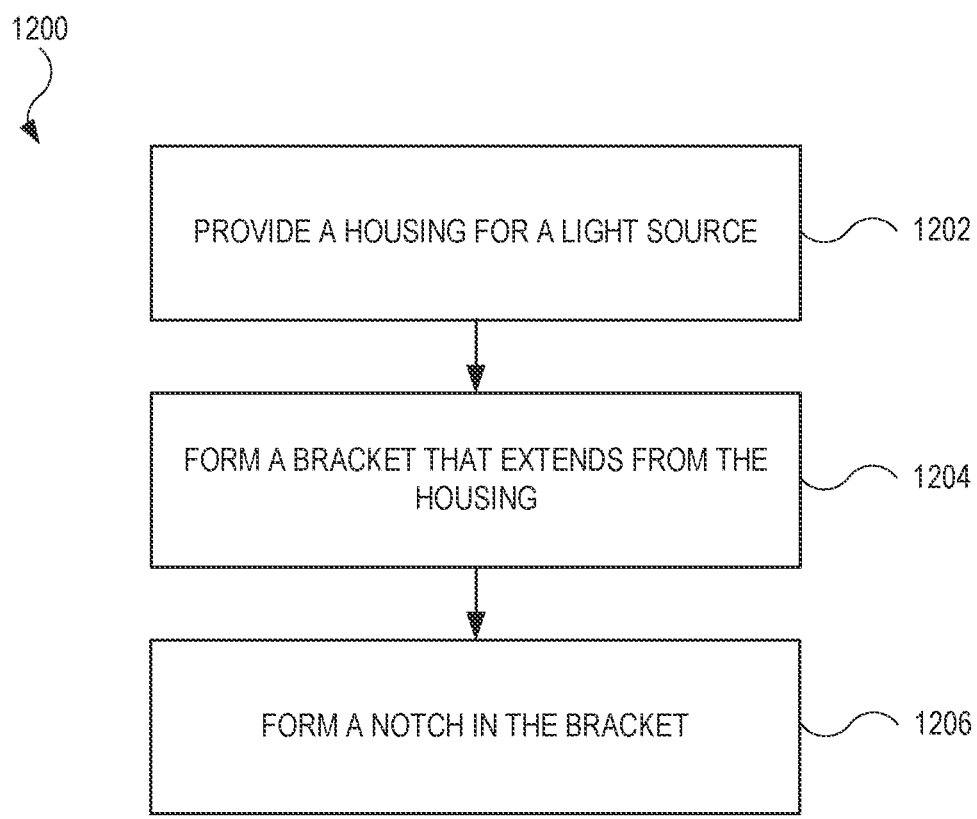
FIG. 17 illustrates a flow diagram showing an example of a process that may be carried out for manufacturing an apparatus, in accordance with implementations of the subject technology.

FIG. 17 illustrates a flow diagram showing an example of a process 1200 that may be carried out for manufacturing an apparatus, in accordance with implementations of the subject technology. For explanatory purposes, the process 1200 is primarily described herein with reference to an apparatus, such as the apparatus 230 shown in FIGS. 3 and 4, as a non-limiting example. However, the process 1200 is not limited to the apparatus 230 shown in FIG. 3, and one or more blocks (or operations) of the process 1200 may be performed by one or more other structural components of other suitable moveable apparatuses, devices, or systems. For example, the process 1200 may be applicable to the apparatus 330 shown in FIG. 8 or the apparatus 1130 shown in FIG. 14. Further for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

At step 1202, a housing for a light source is provided. The housing may be formed from a molding operation (e.g., injection molding). The light source may include one or more light sources, including LED or incandescent bulbs, as non-limiting examples. Additionally, a cover (e.g., transparent cover) may secure with the housing.

At step 1204, a bracket that extends from the housing is formed. The bracket is designed to secure the apparatus with a vehicle. The bracket may be representative of one or more additional brackets extending from the housing.

At step 1206, a notch in the bracket is formed. In one or more implementations, in response to an applied force to the housing, the bracket is configured to break at the notch. In this regard, the notch (representative of one or more notches) is designed to provide a weak point in the bracket, thereby allowing the bracket to bracket in response to, for example, a pedestrian applying the applied force.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
   a housing configured to carry a light source;
   a first bracket configured to couple the housing with a vehicle, the first bracket comprising a first notch, wherein in response to an applied force to the housing, the first bracket is configured to break at the first notch, thereby allowing movement of the housing and the light source; and
   a damper positioned between the housing and the vehicle.

2. The apparatus of claim 1, further comprising a second bracket, wherein:
   the first bracket extends from the housing in a first direction, and
   the second bracket extends from the housing in a second direction different from the first direction.

3. The apparatus of claim 2, wherein the first direction is perpendicular to the second direction.

4. The apparatus of claim 2, wherein the first bracket and the second bracket are integrally formed with the housing.

5. The apparatus of claim 2, wherein the first bracket and the second bracket are fastened to the housing.

6. The apparatus of claim 2, wherein:
   the second bracket comprises a second notch, and
   in response to the applied force, the second bracket is configured to break at the second notch.

7. The apparatus of claim 1, a wherein the damper is coupled with the housing and configured to absorb at least some of the applied force.

8. The apparatus of claim 7, wherein the damper comprises a spring.

9. The apparatus of claim 1, wherein the damper is located in an internal volume of the housing.

10. An apparatus, comprising:
    a housing;
    a light source carried by the housing; and
    a first clip extending from the housing and configured to couple with a module of a vehicle, wherein in response to an applied force to the housing, the first clip is configured to move relative to the module.

11. The apparatus of claim 10, further comprising a first bracket extending from the housing, the first bracket comprising a first notch, wherein in response to the applied force, the first bracket is configured to break at the first notch, thereby allowing movement of the first clip.

12. The apparatus of claim 11, wherein:
    the housing comprises a first surface and a second surface different from the first surface,
    the first clip extends from the first surface, and
    the first bracket extends from the second surface.

13. The apparatus of claim 12, further comprising a second bracket extending from the housing, the second bracket comprising a second notch, wherein in response to the applied force, the second bracket is configured to break at the second notch.

14. The apparatus of claim 13, further comprising a second clip extending from the second surface between the first bracket and the second bracket.

15. The apparatus of claim 11, wherein:
the first clip extends in a first direction, and
the first bracket extends in a second direction different from the first direction.

16. The apparatus of claim 11, wherein the first clip and the first bracket are integrally formed with the housing.

17. A vehicle, comprising:
a body comprising a cavity; and
an apparatus located in the cavity and coupled to the body, the apparatus comprising:
a housing;
a light source carried by the housing;
a plurality of brackets extending from the housing;
a module coupled to the body; and
a clip coupled to the housing and engaged with the module;
wherein in response to an applied force to the apparatus, the plurality of brackets are configured to break away from the housing and the housing is configured to move within the cavity, the clip moves relative to the module.

18. The vehicle of claim 17, wherein:
the module comprises a first extension and a second extension, and
the clip is positioned between the first extension and the second extension.

19. The vehicle of claim 17, wherein:
the apparatus further comprises a slot, and
the module further comprises an opening configured to receive a bolt that extends into the slot.

20. The vehicle of claim 17, further comprising a damper extending from the housing, the damper configured to absorb at least some of the applied force.

* * * * *